Jan. 6, 1953

A. G. HORVATH 2,624,268

ELECTRIC TOASTER

Filed Jan. 10, 1947

INVENTOR.
Anthony G. Horvath
BY
Harry S. Demarr
ATTORNEY.

Jan. 6, 1953  A. G. HORVATH  2,624,268
ELECTRIC TOASTER
Filed Jan. 10, 1947  5 Sheets-Sheet 2

INVENTOR.
Anthony G. Horvath
BY
ATTORNEY.

Jan. 6, 1953  A. G. HORVATH  2,624,268
ELECTRIC TOASTER

Filed Jan. 10, 1947  5 Sheets-Sheet 3

INVENTOR.
Anthony G. Horvath
BY
Harry S. Dumass
ATTORNEY.

Jan. 6, 1953  A. G. HORVATH  2,624,268
ELECTRIC TOASTER
Filed Jan. 10, 1947  5 Sheets-Sheet 5

INVENTOR.
Anthony G. Horvath
BY
Harry S. Ducas
ATTORNEY.

Patented Jan. 6, 1953

2,624,268

UNITED STATES PATENT OFFICE 2,624,268

ELECTRIC TOASTER

Anthony G. Horvath, Dayton, Ohio, assignor to The Hoover Company, North Canton, Ohio, a corporation of Ohio Application January 10, 1947, Serial No. 721,225

20 Claims. (Cl. 99—329)

The present invention relates to electric bread toasters and more particularly to a thermal timing mechanism for timing the duration of the toasting interval whereby the operator may obtain toast cooked exactly as he or she desires.

In the past it has been the usual practice to time the toasting operation by a clockwork mechanism. Clock timers have the defect that toasting time is fixed and accordingly the bread is progressively toasted more and more for each succeeding toasting operation because the toaster itself is hotter for each succeeding toasting operation especially when the succeeding operations follow each other in rapid succession.

An attempt has been made to overcome this difficulty by providing a compensating thermostat to speed up the operation of the clockwork mechanism for each succeeding toasting operation.

Such timers have not been entirely satisfactory because of their complexity and of their unreliableness in operation.

As a result thermal timers have been developed. Thermal timers inherently are self compensating in that the timer as a whole also becomes progressively hotter for each succeeding toasting operation and accordingly shortens the toasting period for each succeeding operation.

It has been found, however, that thermal timers have a tendency to over-compensate. That is, for each succeeding toasting operation, the toast is cooked progressively less and less for any particular timer setting.

This result comes about by reason of the fact that heat is stored in parts of the thermal timer from the preceding toasting operation and as a consequence the timer becomes hotter and hotter at the start of each succeeding toasting operation. This causes the thermally responsive element of the timer to act faster and faster for each succeeding toasting operation.

According to the present invention, this difficulty is remedied by allowing the thermal timer to cool after each toasting operation before the succeeding toasting operation is initiated so that no toasting operation can be initiated until the thermally responsive element of the timer is at its proper temperature to properly time the succeeding toasting operation.

The prior art teaches the preliminary cooling of a thermal timer before the next succeeding toasting operation can be initiated.

However, in prior art devices, it has been necessary for the operator to wait until the timer has cooled before the next succeeding toasting operation can be initiated.

According to the present invention the operator can immediately insert new slices to be toasted after a prior toasting operation without waiting for the thermal timer to cool. The succeeding toasting operation will then proceed automatically without any further attention from the operator.

According to the present invention, a second toasting operation may be begun immediately after a preceding one without waiting for the thermally responsive element to cool. The toast carriages are latched in toasting position regardless of the position of the thermally responsive element.

If the thermally responsive element is cold when new slices are inserted the succeeding operation will begin immediately. If the thermally responsive element is still warm, the toast carriers will be latched in toasting position regardless. The operator need not even know that the succeeding toasting operation has not begun. The thermally responsive element is merely given a chance to cool and the succeeding toasting operation will proceed automatically without any further attention from the operator. This will assure that the thermally responsive element is properly conditioned for each succeeding toasting operation irrespective of the time interval between the end of a preceding toasting operation and the insertion of fresh bread into the toaster.

It is known in prior devices to heat a bimetal timing element by means of an auxiliary heater energized simultaneously with the main heaters and to direct the heat from the auxiliary heater to the bimetal timer by means of a reflector.

According to this invention, heat is directed from an auxiliary heater to a bimetal timer by means of a reflector which is adjustable both manually and thermostatically to vary the quantity of heat which is transmitted to the bimetal timer so as to control the duration of the toasting interval to adjust for light, medium, or dark toast as well as to compensate for rises in toaster temperature as the temperature of the toaster rises with repeated use in rapid succession.

According to this invention, the toast carriers may be moved to toasting position and latched in that position whether or not the thermally responsive element has cooled. A signal light is lit when the carriers are moved to toasting position whether or not the thermal timer has cooled from a preceding operation in order to simulate operation The thermal timer then cools and the succeeding toasting operation proceeds without any further attention from the operator.

According to this invention, a secondary carriage is provided which is movable vertically relative to the bread carriers and is spring-biased to downward position. If the thermal timer has cooled, the secondary carriage moves with the bread carriers to downward position and a toasting operation is initiated immediately. However, if the thermal timer has not had time to cool the bread carriers are nevertheless latched in downward position. However, a stop is projected into the path of the secondary carriage and it is prevented from moving to its lowermost position, which prevents energization of the main and secondary heaters. When the timer has cooled the stop is removed from the path of the secondary carriage and the succeeding toasting operation is then initiated.

According to the present invention a thermal timer is provided which embodies mechanism which is movable through a position to initiate a toasting operation when the thermally responsive element is cooled but in which the mechanism is prevented from moving through that position when the thermally responsive element is hot.

Other objects and advantages of this invention will become apparent as the description proceeds when taken in connection with the accompanying drawings in which.

Figure 1:
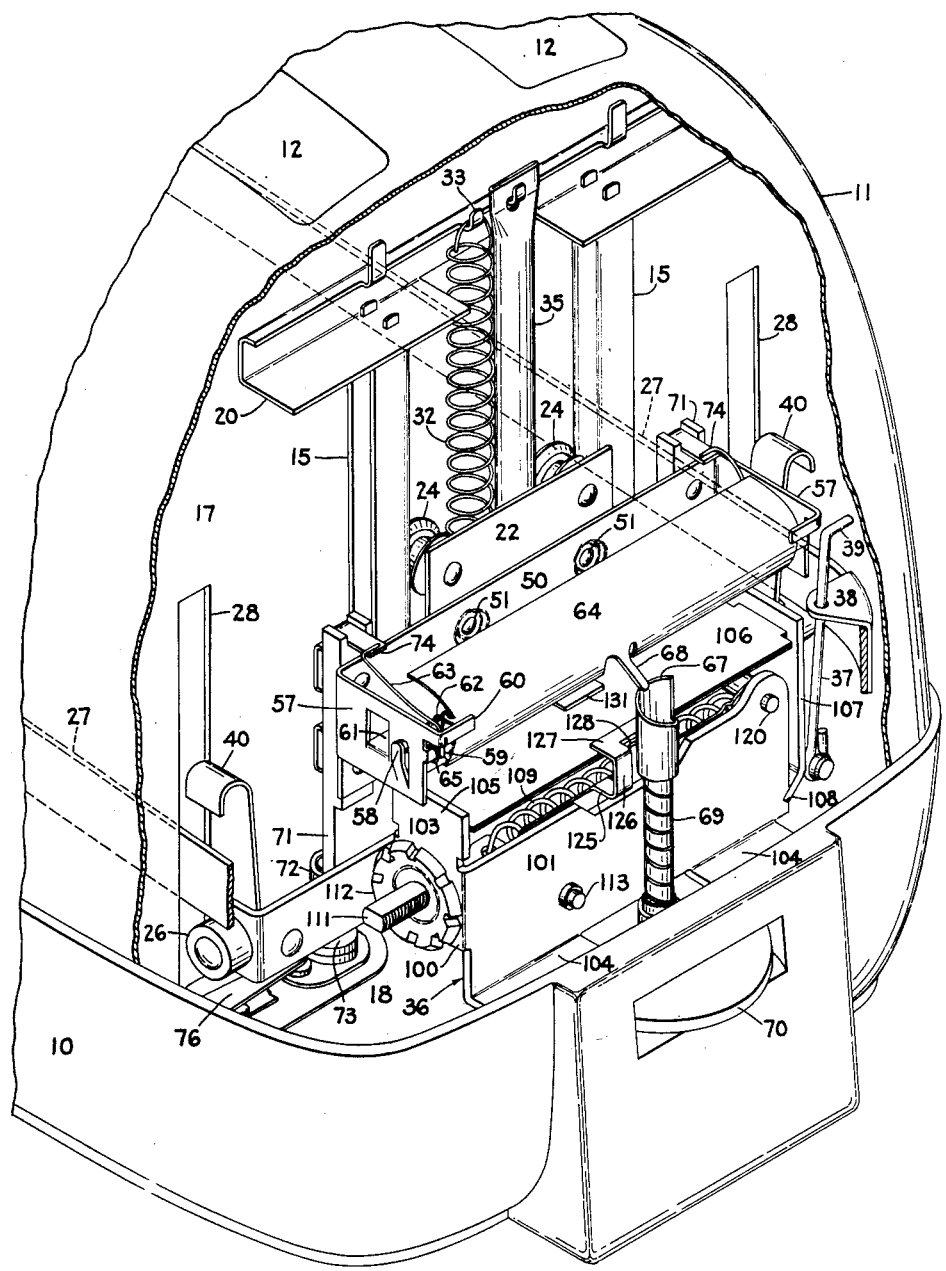
Figure 1 is a perspective view of a toaster with the parts broken away to show the timer according to this invention.

Referring to the drawings, a plastic base 10 forms a support for the entire toaster and upon which are mounted all of the parts of the toaster. An appearance housing 11 fits into an interior peripheral shoulder in the base 10 and covers all the working parts of the toaster. The appearance housing 11 is provided with bread receiving slots 12 into which bread is inserted for toasting purposes.

A base plate 13 is mounted within the peripheral edge of the base 10 below the ledge which supports the appearance housing 11. The base plate 13 forms a support or attaching means for all of the working parts of the toaster.

Figure 2:
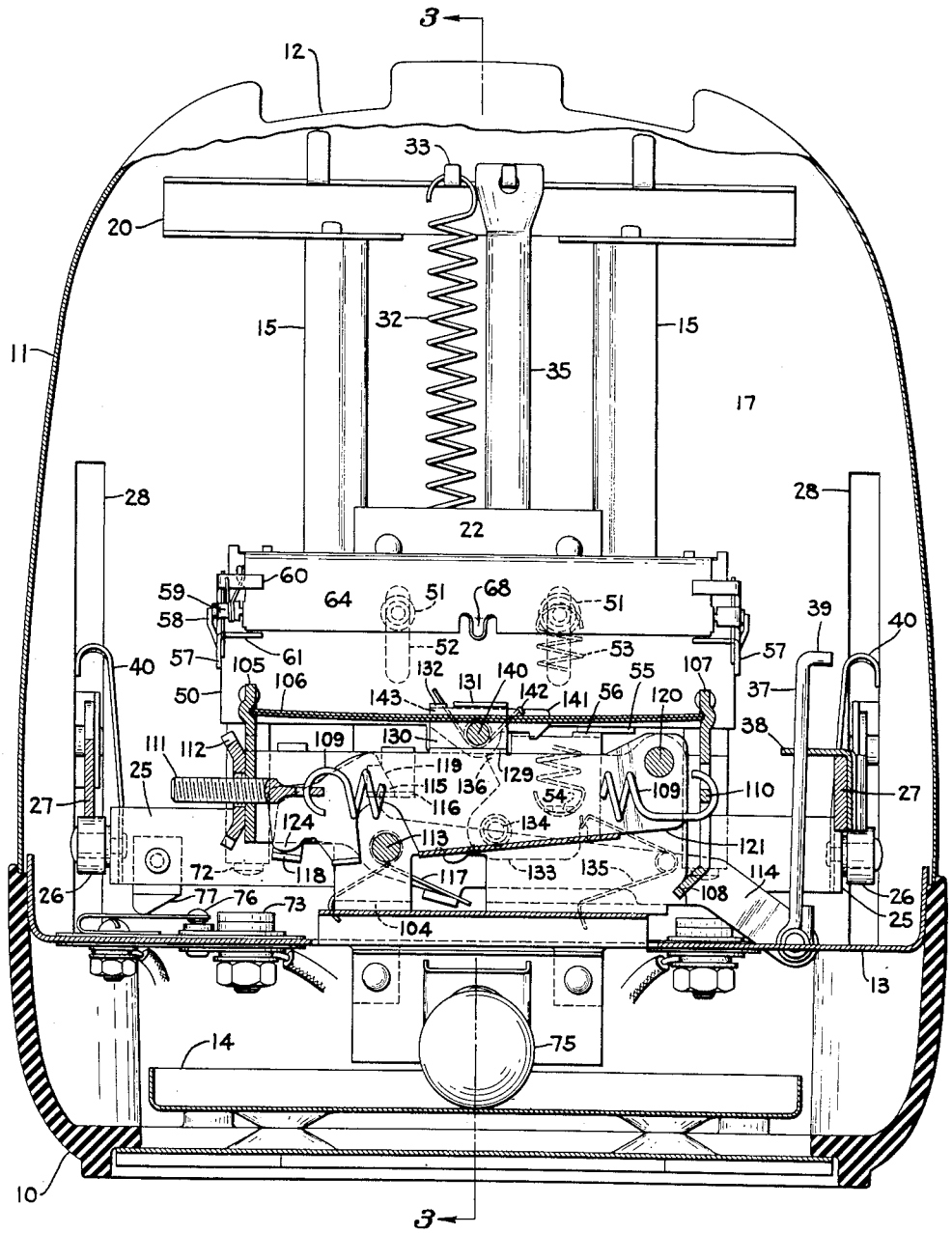
Figure 2 is a cross sectional view through the mechanism compartment depicting some of the details of the timing mechanism according to this invention.
Figure 3:
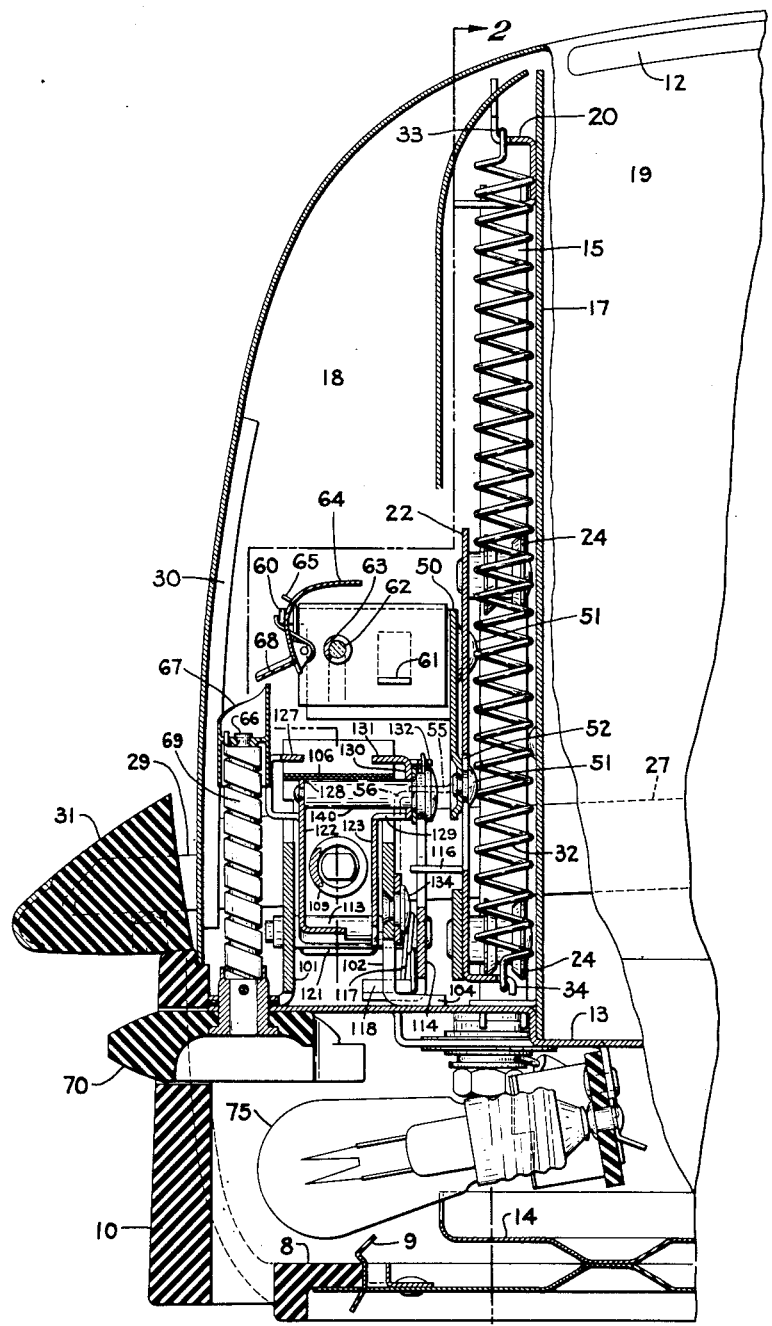
Figure 3 is a cross sectional view of the mechanism compartment according to this invention taken on line 3—3 of Figure 2.

A crumb tray 14, Figs. 2 and 3, is removably mounted in a bottom opening in the base 10 by spring fingers 9 which cooperate with the edges 8 of an opening in the base 10 to hold the tray in assembled position. The tray 14 is positioned to receive crumbs from the toasting chambers and may be emptied after removal as the occasion arises. Beyond the opening formed by edge 8, the base is provided with other openings for providing air circulation through the toaster during operation.

Rigidly attached to the base plate 13 are a pair of spaced parallel vertically extending guide posts 15 of channel formation having their closed sides facing each other. At their upper ends the guide posts are supported by a bracket 20 which extends forwardly from a dividing plate 17 near its upper end. The dividing plate 17 divides the interior of the toaster proper into a mechanism compartment 18 and a toasting chamber 19.

Bread carriers 16 extend rearwardly from the main carriage plate 22 through elongated openings 21 in the plate 17 so that the carriers 16 may be moved from an upper bread receiving position where the bread will extend slightly above the appearance housing 11 through the openings 12, to a lower toasting position where the carriers 16 are positioned between spaced heaters 23. The main carriage plate 22 is guided for vertical movement by rollers 24 which cooperate with closed sides of the channel guide rods 15 to guide the main carriage plate 22 and the carriers 16 in a straight line vertical movement.

Extending from each side of the plate 22 and bent rearwardly as at 25 are a pair of extensions which carry rollers 26 cooperating with the arms 27 of a manually manipulating lever to move the main carrier plate 22 and the bread carriers 16 to toasting position. The arms 27 are pivoted at their rear ends to the outside of the side walls (not shown) of the toasting chamber 19 and extend through elongated openings 28 in the dividing plate 17. At their forward end the arms 27 are bent forwardly at 29 to extend through elongated openings 30 in the appearance housing 11. On the exterior of the appearance housing 11 a manipulating handle 31 is secured to the forward extending ends 29 of the arms 27.

The main carriage plate 22 and the bread carriers 16 are spring-biased to upper bread receiving position by tension spring 32 secured at its upper end to a hook 33 on the bracket 20 and at its lower end is anchored to a hook 34 extending rearwardly from the main carriage plate 22. A dash pot mechanism 35 of any suitable construction is connected between bracket 20 and the main carriage plate 22 in order to cushion the impact of the spring 32 as it pulls the main carrier plate 22 and its associated parts to its upper bread receiving position.

A latch mechanism, to be later described in detail, is generally indicated by the reference numeral 36. It is mounted on the base plate 13 and is adapted to latch the main carriage plate 22 and bread carriers 16 in their toasting position when moved to that position. Manual means for releasing the latch independently of the timer is provided in the form of a link 37 connected at its lower end to the latch release lever of the latch mechanism 36. The link 37 extends upwardly through an opening in the lug 38 welded to one of the arms 27 and has a bent end 39 which engages the lug 38 when the arms 27 are moved reversely in an upper direction to release the latch mechanism 36. Hooks 40 are connected to the extensions 25 to limit upward movement of the arms 27 relative to the main carriage plate 22.

The secondary carriage plate 50 is mounted for vertical movement on the main carriage plate 22 by means of rivets 51 extending through slots 52 in the plate 22 and is biased to its lowermost position by the spring 53 having its upper end anchored to one of the rivets 51 and its lower end anchored to a lug 54 struck from the plate 22.

Extending forwardly from the secondary carriage plate 50 is a lug 55 which engages a lug 56 of the latch mechanism 36 to prevent, under certain conditions which will be explained hereinafter, the secondary carriage plate 50 from moving to its lowermost position along with the main carriage plate 22.

Extending forwardly from the secondary carriage plate 50 at each end thereof are a pair of arms 57 having struck out spring tabs 58, struck out pintles 59 and struck out stops 60 and 61. A ceramic rod 62 extends through the openings formed by the spring tabs 58 and is held from endwise movement by the tabs 58. Upon the rod 62 is mounted a resistance wire 63 which forms an auxiliary heater for the timer as will be explained hereinafter. The pintles 59 form a pivotal support for a reflector 64 which is spring-biased by a spring 65 away from the heater 63 against the stop 60 as shown in Figure 3. The struck out portions 61 form stops for the reflector 64 to prevent excess movement of the reflector 64 in a clockwise direction from the position shown in Figure 3.

Figure 4:
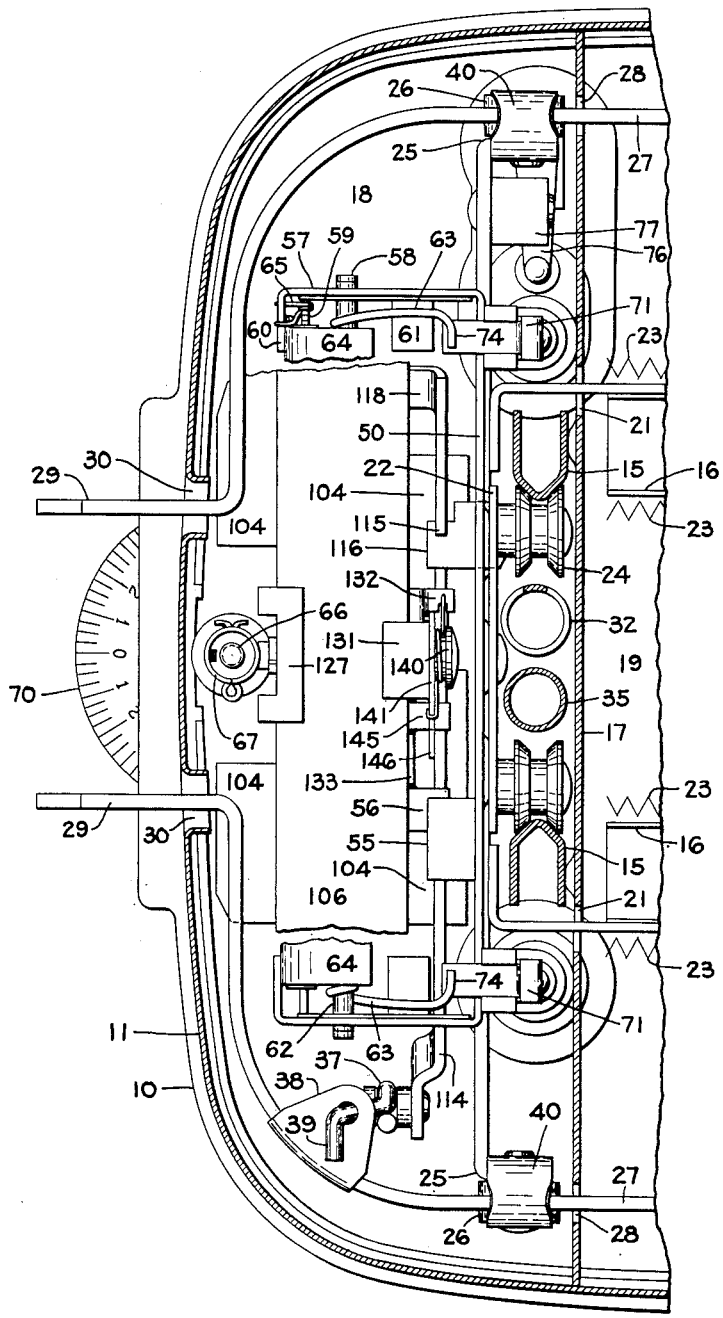
Figure 4 is a top plane view of the mechanism according to this invention.

Rotatably mounted on the base plate 13 in front of the latch mechanism 36 is a shaft 66 carrying a cam 67 at its upper end. The cam 67 is adapted to contact an arm 68 of reflector 64 under certain conditions which will be explained in more detail hereinafter. At its lower end the shaft 66 carries a manipulating knob 70 having a portion extending through an opening in the front of the base 10 and carrying indicia as shown in Figure 4. The cam 67 is loosely mounted on the upper end of the shaft 66 and is connected to the lower end of the shaft by a spirally wound bimetal 69 for a purpose to be hereinafter described.

Extending downwardly from each end of the secondary carriage plate 50 are a pair of conducting arms 71 which at their lower ends carry contacts 72 adapted to engage spaced fixed contacts 73 mounted on base plate 13 when the secondary carriage plate 50 is in its lowermost position. At their upper ends the conducting arms 71 are connected to the ends of the resistance wire 63 as shown at 74 in Figure 1.

Figure 7:
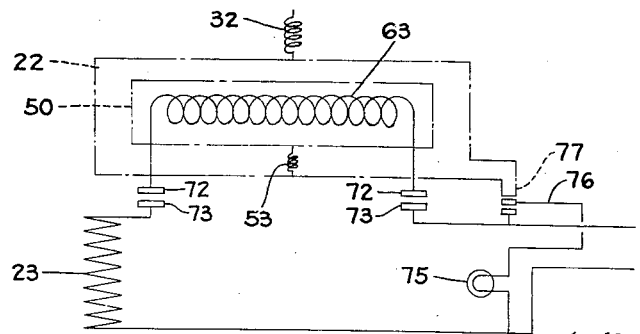
Figure 7 is a wiring diagram showing how the elements are electrically connected.

As shown in the wiring diagram of Figure 7 one of the contacts 73 is connected to one side of the line, the other to one side of main heaters 23 and the other side of the main heaters 23 is connected to the other end of the line so that when contacts 72 are in contact with contacts 73 the heaters 23 and 63 are connected in series.

A signal light 75 is mounted beneath the base plate 13 immediately behind the knob 70, which may be made of translucent material, so as to illuminate the knob 70 when the light 75 is illuminated. A spring switch 76 is adapted to be closed by a lug 77 mounted upon one of the arms 25 of the main carriage plate 22 when the main carriage plate 22 is moved to toasting position. By reference to Figure 7 it will be seen that the signal light 75 is connected in parallel with the main heaters 23.

*Latch mechanism*

The latching mechanism generally indicated by the reference numeral 36 comprises a bracket 100, having a front side wall 101, a rear side wall 102, an end wall 103, and outwardly bent feet 104 which may be welded or otherwise secured to the base plate 13. The end wall 103 has a portion 105 extending above the side walls 101 and 102, which has a recess for supporting one end of a bimetallic strip 106.

The opposite end of the bimetallic strip 106 is supported in a recess in the upper end of a member 107 which is pivoted to the end walls 101 and 102 as at 108. Compression is applied to the opposite ends of the bimetallic strip 106 by a spring 109 anchored at one end to a lug 110 of pivoted member 107 and at its opposite end by an eye in the inner end of the screw 111 which passes through an opening in the end 103 of the bracket 100. A nut 112 is threaded onto the outer end of the screw 111 and contacts the end 103 to apply more or less tension to the spring 109 and correspondingly more or less compression to the ends of the bimetallic strip 106. This constitutes a factory adjustment for the bimetal strip 106. The bimetallic strip 106 constitutes the thermally responsive element of the thermal timer for controlling the duration of the toasting interval.

The bimetallic strip 106 is so made that it will be flexed in an upward bowed position when cold and in a downward bowed position when hot. A pin 113 extends through openings in the side walls 101 and 102 of the bracket 100 and extends beyond the inner wall 102 as shown in Figure 3 to form a shoulder spaced inwardly from the inner wall 102. Abutting against the shoulder of pin 113 and pivotally mounted thereon, is the main latch release lever 114 which is spaced inwardly from the inner wall 102 of bracket 100. The pivot 113 is near the left hand end of the bracket 100, as viewed in Figs. 1, 5 and 6, and the lever 114 extends beyond the right hand end of the bracket 100. The lower end of link 37, previously mentioned, is pivoted to the right hand end of latch release lever 114.

The main latch lever 114 includes a hook 115 which is adapted to overlie a projection 116 struck forwardly from the main cariage plate 22 to hold the main carriage plate 22 and the bread carriers 16 in their toasting position against the bias of the spring 32. The lever 114 is spring-biased clockwise by spring 117 so that the right hand end normally rests against the inner feet 104 of the bracket 100. As previously mentioned, upward movement of arm 27 by manipulation of the hand piece 31 will cause the lug 38 to engage the hook 39 of rod 37 so as to lift the right hand end of lever 114 to move it clockwise and move the hook 115 from above the lug 116 and release the main carriage plate 22. This constitutes the manual release for the toaster carrier independently of the timer.

The main latch lever 114 extends beyond the pivot 113 to the left beyond the end 103 of the bracket 100 and has an inturned lug 118 which extends forwardly beyond the inner wall 102 of bracket 100 as shown in Figure 3. Immediately above the hook 115 the lever 114 has a cam surface 119 which is engaged by the lug 116 of the plate 22 so as to move the lever 114 slightly in a counter-clockwise direction against the bias of the spring 117 until the lug 116 clears the hook 115 to permit the spring 117 to move the hook 115 to a position overlying the struck out portion 116 so as to latch the main carriers 22 and the bread carriers in their lowermost toasting position.

Pivoted at 120 to the upper right hand end of walls 101 and 102 and lying between the walls 101 and 102 is an actuating lever 121 which is of inverted U-shape in cross section as shown in Figure 3. The actuating lever 121 has a pair of side walls 122 and 123 lying between and extending above the walls 101 and 102 of the bracket 100. The left hand end of lever 121 is rounded at 124 and overlies the lug 118 of lever 114 so that when lever 121 is moved counter-clockwise the lever 114 is also moved counter-clockwise to move the hook 115 from above the lug 116 and thus release the toast carriers.

At its central portion the front wall 122 of lever 121 is cut and bent forwardly at spaced points as shown at 125, upwardly as shown at 126 and rearwardly as shown at 127 to form a tab overlying the bimetal 106 and a portion 128 extending directly upwardly to a point beneath the bimetal 106 as shown in Figs. 1 and 3.

At its central portion the rear wall 123 of the lever 121 is bent rearwardly to form a horizontal abutment 129, bent upwardly to form a vertically extending portion 130 and then forwardly to form a second tab 131 overlying the bimetal 106. A portion of the vertically extending portion 130 is also bent rearwardly to form a lug 132 as shown at Figures 3, 4, 5, and 6.

Figure 5:
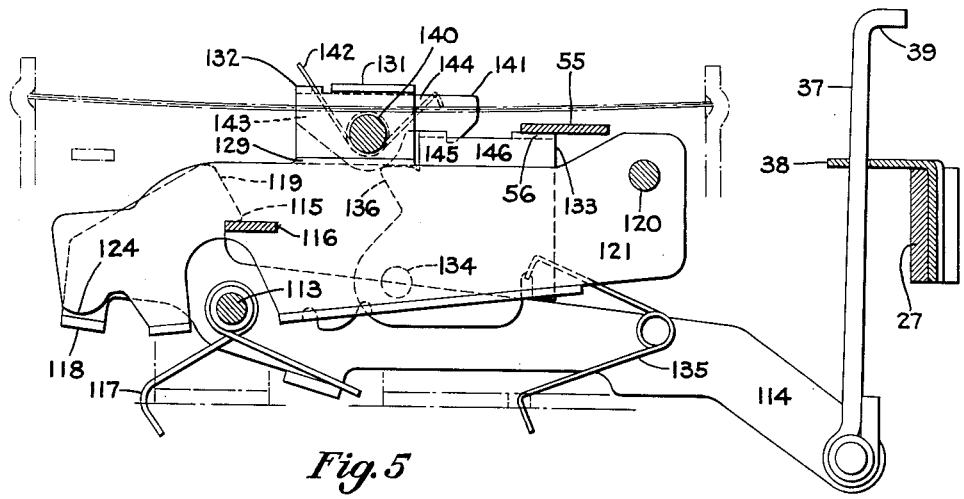
Figure 5 depicts details of the timing mechanism according to this invention when the thermal element is hot and the bread carriers in lowered position.
Figure 6:
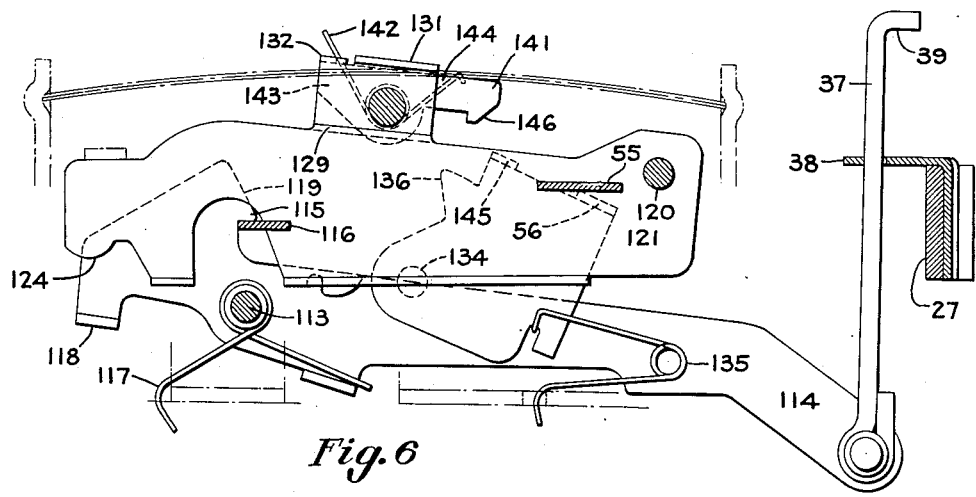
Figure 6 is a view similar to Figure 5 showing the position of the parts when the thermal element is cool and the carriers are moved to lowered position.

Pivoted at 134 to the outside of the inner wall 102 of the bracket 100 is a stop lever 133 which is normally spring-biased in a counter-clockwise direction by a spring 135 as shown in Figs. 2, 5, and 6. The lug 56 previously mentioned is struck rearwardly from the lock lever 133 so as to underlie lug 55 on the secondary carriage plate 50 at all times. Immediately above its pivot point 134 the lock lever 133 is provided with a hook portion 136 which underlies the horizontal abutment 129 of actuating lever 121 which extends rearwardly from the rear wall 123 of the lever 121 when in the position shown in Figure 5 but which clears the abutment 129 when the lock lever is rotated clockwise as shown in Figure 6.

The upstanding portions 128 and 130 of actuating lever 121 form supports for a pin 140 underlying the bimetal 106 and forming a pivotal support for a locking latch 141 which lies against the outer side of the portion 130 and is spring-biased in a clockwise direction by a spring 142 which holds the tail 143 of lever 141 against the rearwardly turned portion 132 of the lever 121. The latch 141 is free to pivot in a counter-clockwise direction because the portion 131 of lever 121 is turned in the opposite direction as shown in Fig. 5. The hooked end 146 of the locking latch 141 overlies a lug 145 to hold the lock lever 133 against clockwise movement under certain conditions.

*Operation when cold*

It will be noted that when both the main carriage plate 22 and the secondary carriage plate 50 are in downward position the heater 63 overlies the bimetal 106 and the reflector 64 will direct heat from the heater 63 to the bimetal 106 in an amount dependent upon the position of the cam 67. If the operator desires dark toast he will move the knob 70 so as to cause the reflector 64 to pivot counter-clockwise under the action of its spring 65 so as to direct only a portion of the heat from the heater 63 to the bimetal 106 so that it will take a longer time to heat the bimetal 106 and thus prolong the toasting interval.

The operator will then insert bread slices through the openings 12 in the appearance housing 11 so as to rest on the bread carriers 16 and project slightly from the openings 12. The hand piece 31 is then grasped and moved to its lowermost position as shown in Fig. 3. This will cause the arms 27 to press downwardly on the rollers 26 and move the main carriage plate 22 and bread carriers 16 downwardly to toasting position where the bread slices will be positioned between the spaced heaters 23.

The lug 116 on the main carrier plate 22 will also move downwardly and contact the cam face 119 of the latch lever 114 and move it counter-clockwise against the bias of the spring 117 until the lug 116 clears the hooked end 115 when the latch lever 114 will be returned and move the hook 115 to a position overlying the lug 116 and thus latch the toast carriers and the main carriage plate 22 in their toasting position.

Movement of the carriage plate 22 to downward position will also cause the lug 77 to contact the spring 76 to close the switch 76 and energize the signal light 75 to illuminate the knob 70 to indicate that the bread carriers have been moved to their toasting position.

The secondary carriage plate 50 will also be carried along with the main carriage plate 22 until the lug 55 on plate 50 engages the lug 56 on stop lever 133. Since at this time the bimetal 106 is cold and in upward bowed position as shown in Fig. 6, the hooked end 146 of locking latch 141 will be free of lug 145 of stop lever 133 so that the stop lever 133 is free to rotate clockwise against the bias of the spring 135. Since the spring 53 which biases the secondary carriage plate 50 to its downward position is stronger than the spring 135 the stop lever 133 will be rotated clockwise by the engagement of the lug 55 of the plate 50 with the lug 56 of the stop lever 133 and the stop lever 133 will move to the position shown in Fig. 6. This will permit the secondary carriage plate 50 to move to its lowermost position along with the main carriage plate 22.

Movement of the secondary carriage plate 50 to its lowermost position will cause the contacts 72 to contact the fixed contacts 73 so as to simultaneously energize the main heaters 23 and the auxiliary heater 63 to initiate the toasting interval. Movement of the secondary carriage plate 50 will also move the heater 63 and reflector 64 to a position immediately above the bimetal 106. In moving to its lowermost position the reflector 64 is moved from the position shown in Figure 3 to a position to reflect heat from the heater 63 to the bimetal 106 by contact of the arm 68 with the cam 67. The final position of the reflector 64 and correspondingly the amount of heat reflected to the bimetal 106 will depend upon the setting of the cam 67. Since the toaster is cold at this time the spiral bimetal 69 will have moved the cam to a position to reflect more heat, than when the toaster is hot, to the bimetal 106 regardless of the setting of the manual knob 70.

Heat from the heater 63 will be radiated directly to the bimetal 106 as well as reflected by the reflector 64. This will cause the bimetal 106 to heat up and warp so as to move downwardly. By the time the bread in the toasting chamber is toasted the bimetal 106 will have moved to and past its dead center position which will cause the bimetal 106 to snap to its downwardly bowed position under the influence of the spring 109. In snapping to its downwardly bowed position the bimetal 106 will impart a sharp blow to the pin 140 so as to pivot the actuating lever 121 counter-clockwise, causing its rounded end 124 to contact the lug 118 of the latch release lever 114 and pivot it counter-clockwise also, in opposition to the spring 117, so as to move the hook 115 from above the lug 116 on the main carriage plate 22 and permit the toast carriers and associated mechanism to move to their upper position under the action of the spring 32.

The actuating lever 121 was permitted to move downwardly sufficiently for its end 124 to contact the lug 118 of the latch lever 114 because the stop lever 133 was in its clockwise position so that its shoulder 136 was beyond the edge of the abutment 129 of the actuating lever 121. As will be seen hereinafter under some conditions it is impossible to move the actuating lever 121 through the position just described.

When the bimetal 106 snapped to its downward position the stop lever 133 was in its clockwise position as shown in Figure 6. However, when the carriage plate 22 was released the lug 55 when removed from above the lug 56 of the lock lever 133 which permitted the spring 135 to move the lock lever 133 in a counter-clockwise direction. At this time the locking latch 141 is in the position shown in Figure 5. The lug 145 of the stop lever 133 will engage the sloped end of the hook 146 of lever 141 and pivot the lock latch 141 counter-clockwise against the bias of the spring 142 until the lug 145 snaps behind the hook 146 whereby all of the parts will assume the position shown in Fig. 5.

The parts always assume this position immediately after the carriage plate 22 is released and while the bimetal 106 is still hot. If the bimetal 106 is allowed to cool before a succeeding toasting operation is begun the bimetal 106 will move to its upward bowed position of Figure 6 and remove the hook 146 from in front of the lug 145 leaving the lock lever 133 free to move to the position of Figure 6 when the toast carriers are again moved to toasting position.

Movement of the carrier plate 22 and the secondary carriage plate 50 to upward position will deenergize the main heaters 23, the auxiliary heater 63 and the signal light 75. At the same time the auxiliary heater 63 and the reflector 64 will be moved upwardly away from the bimetal 106 and the reflector 64 will move under the bias of its spring 65 to the position shown in Figure 3 so that no heat will be reflected from the heater 63 to the bimetal 106 and thus permit the bimetal 106 to cool as quickly as possible. It has been found that the bimetal 106 will cool in a few seconds.

*Operation when hot*

Assume now that a second toasting operation is initiated before the bimetal 106 has had time to cool. Bread will be inserted as before and the hand piece 31 moves to its lowermost position. The main carriage plate 22 and the bread carriers 16 will move downwardly as before and the signal light 75 will be lit by lug 77 closing switch 76 so as to simulate operation even though the toasting interval has not actually begun.

The secondary carriage plate 50 will move downwardly with the main carriage plate 22 until its lug 55 comes into contact with the lug 56 of the stop lever 133. Since the bimetal 106 is still hot the parts will be in the position shown in Figure 5 and the hook 146 of locking latch 141 will overlie the lug 145 of the stop lever 133 and prevent clockwise movement thereof.

This will arrest movement of the secondary carriage 50 and it will be held in the position shown in Figure 3. It is to be noted that the reflector 64 is still positioned to direct heat away from the bimetal 106 and the bimetal will continue to cool.

In the matter of a few seconds the bimetal 106 will have cooled and moved upwardly to a position past its dead center position when the force of the spring 109 will cause it to snap to its upward bowed position as shown in Figure 6. In moving to its upward bowed position the bimetal 106 will contact the inturned tabs 127 and 131 of the actuating lever 121 and move it clockwise. This will move the locking latch 141 essentially in a vertical direction removing the hook 146 from in front of the lug 145, permitting the stop lever 133 to move clockwise to the position shown in Figure 6 under the bias of spring 53.

The spring 53 will move the secondary carriage plate 50 to its lowermost position to energize the main heaters 23 and the auxiliary heater 63 and move the heater 63 and reflector 64 into operative position and the toasting interval will proceed as previously described.

Thermal timers have a tendency to over-compensate. That is, the thermal element becomes hotter and hotter with succeeding toasting operation and the toasting interval becomes shorter and shorter. This tendency over-runs the tendency of the toaster as a whole to get hotter so that eventually the bread is undertoasted. To overcome this the bimetal 69 is so made that it will turn the cam 67 to move the reflector 64 to a position where less and less heat is directed to the bimetal 106 in succeeding toasting intervals after the first. This will overcome the tendency of the bimetal 106 to over-compensate.

From the foregoing it can be seen that this invention provides an efficient, accurate toaster timing mechanism in which it is unnecessary for the operator to wait after a first toasting operation before proceeding with a succeeding one. All that is necessary is for the operator to insert the new charge and move the manipulating handle to its lowermost position. No further attention is needed from the operator. The succeeding toasting operation will proceed to completion without further attention from the operator regardless of the condition of the timer when the new charge is inserted.

While I have shown but a single embodiment of my invention it is to be understood that this embodiment is to be taken as illustrative only and not in a limiting sense. I do not wish to be limited to the particular structure shown and described but to include equivalent variations thereof except as limited by the scope of the claims.

I claim:

1. A toaster comprising, bread carriers movable from a bread receiving position to a toasting position, main heating means, a latch constructed to latch said carriers in toasting position, a thermal timer operable to release said latch at the end of each toasting interval, said thermal timer including a thermally responsive element and an auxiliary heater therefor and a reflector positioned to direct heat from said auxiliary heater to said thermally responsive element, said heater, reflector and carriage being so related that said auxiliary heater and reflector is moved away from said thermally responsive element upon release of said latch, manually actuatable means for moving said reflector relative to said heater and a thermally responsive element for moving said reflector relative to said heater and said first thermally responsive element to vary the time of the toasting intervals.

2. A toaster comprising, a base, main heaters, bread carriers movable from an upper bread receiving position to a lower toasting position, secondary means movably carried by said carriage so as to have a portion movable vertically relative thereto, means for moving said bread carriers to toasting position, means operable to arrest movement of the movable portion of said secondary means short of its lowermost position as said bread carriers are moved to toasting position, a thermal timer including a thermally responsive element and a heater therefor, said thermally responsive element having a cold position and a hot position, means operable to latch said carriers in toasting position whether said thermally responsive element is in its hot position or in its cold position, cooperating means on said base and the movable portion of said secondary means for energizing said heaters, means associated with said thermally responsive element and said arresting means and operative upon movement of said thermally responsive element to cold position for releasing said arresting means to cause the movable portion of said secondary means to move to its lowermost position so as to energize said heaters and additional means associated with said thermally responsive element and said latch means operable to release said latch means upon return of said thermally responsive element to its hot position.

3. A toaster including bread carriers movable from a bread receiving position to a toasting position, a thermal timer including a thermally responsive element for timing the toasting interval by being heated so as to move from a cold position to a hot position, heating means for performing the toasting function and for heating said thermally responsive element, means for moving said carriers to toasting position, means operable to latch said carriers in toasting position whether said thermally responsive element is in its cold position or in its hot position, switch means cooperating with said carriers and with said thermally responsive element and operative to energize said heating means if said thermally responsive element is in its cold position when said carriers are moved to toasting position, means operatively associated with said thermally responsive element and with said switch means and operative to block closing movement of said switch means if said thermally responsive element is in its hot position when said carriers are moved to toasting position and means operatively associated with said blocking means and operative by movement of said thermally responsive element to its cold position for moving said blocking means from its blocking position relative to said switch means to permit closing movement of said switch means.

4. A toaster comprising, a base, bread carriers movable from a bread receiving to a toasting position and spring-biased to bread receiving position, a secondary carriage carried by said carriers, said secondary carriage being movable vertically relative to said carriers and being spring-biased to its downward position, a thermal timer for controlling the duration of the toasting interval including a thermally responsive element mounted on said base and a heater therefor mounted on said secondary carriage in a position to heat said thermally responsive element when said carriers are in toasting position, said thermally responsive element having a cold position and a hot position, means for moving said carriers to toasting position, means for latching said carriers in toasting position whether said thermally responsive element is in its hot or cold position, means carried by said secondary carriage for energizing said heater when said secondary carriage is in its lowermost position, means for blocking movement of said secondary carriage to its lowermost position when said thermally responsive element is in its hot position and means actuated by movement of said thermally responsive element to its cold position for removing said blocking means to permit said secondary carriage to move to its lowermost position under the action of its biasing means.

5. A toaster comprising, a base, bread carriers movable from a bread receiving to a toasting position and spring-biased to bread receiving position, a secondary carriage carried by said carriers, said secondary carriage being movable vertically relative to said carriers and being spring-biased to downward position, a thermal timer for controlling the duration of the toasting interval including a thermally responsive element mounted on said base and a heater therefor mounted on said secondary carriage in a position to heat said thermally responsive element when said carriage is in its lowermost position, said thermally responsive element having a cold position and a hot position, means for moving said carriers to toasting position, means for latching said carriers in toasting position whether said thermally responsive element is in its hot or cold position, means carried by said secondary carriage for energizing said heater when said secondary carriage is in its lowermost position, means for blocking movement of said secondary carriage to its lowermost position when said thermally responsive element is in its hot position, means actuated by movement of said thermally responsive element to its cold position for removing said blocking means to permit said secondary carriage to move to its lowermost position under the action of its biasing spring and a reflector carried by said secondary carriage above said heater so as to direct heat from said heater to said thermally responsive element when said secondary carriage is in its lowermost position.

6. A toaster comprising, a base, bread carriers movable from a bread receiving to a toasting position and spring-biased to bread receiving position, a secondary carriage carried by said carriers, said secondary carriage being movable vertically relative to said carriers and being spring-biased to its downward position, a thermal timer for controlling the duration of the toasting interval including a thermally responsive element mounted on said base and a heater therefor mounted on said carriers in a position to heat said thermally responsive element when said secondary carriage is in its lowermost position, said thermally responsive element having a cold position and a hot position, means for moving said carriers to toasting position, means for latching said carriers in toasting position whether said thermally responsive element is in its hot or cold position, means carried by said secondary carriage for energizing said heater when said secondary carriage is in its lowermost position, means for blocking movement of said secondary carriage to its lowermost position when said thermally responsive element is in its hot position, means actuated by movement of said thermally responsive element to its cold position for removing said blocking means to permit said secondary carriage to move to its lowermost position under the action of its biasing spring, a reflector carried by said secondary carriage above said heater so as to direct heat from said heater to said thermally responsive element when said secondary carriage is in its lowermost position, said reflector being movably mounted so as to assume a position to direct heat from said heater toward and away from said thermally responsive element and means effective upon movement of said secondary carriage to its lowermost position for moving said reflector to a position to direct heat from said heater to said thermally responsive element.

7. A toaster comprising, a base, bread carriers movable from a bread receiving to a toasting position and spring-biased to bread receiving position, a secondary carriage carried by said carriers, said secondary carriage being movable vertically relative to said carriers and being spring-biased to downward position, a thermal timer for controlling the duration of the toasting interval including a thermally responsive element mounted on said base and a heater therefor mounted on said secondary carriage in a position to heat said thermally responsive element when said secondary carriage is in its lowermost position, said thermally responsive element having a cold position and a hot position, means for moving said carriers to toasting position, means for latching said carriers in toasting position whether said thermally responsive element is in its hot or cold position, means carried by said secondary carriage for energizing said heater when said secondary carriage is in its lowermost position, means for blocking movement of said secondary carriage to its lowermost position when said thermally responsive element is in its hot position, means actuated by movement of said thermally responsive element to its cold position for removing said blocking means to permit said secondary carriage to move to its lowermost position under the action of its biasing spring, a reflector carried by said secondary carriage above said heater so as to direct heat from said heaters to said thermally responsive element when said secondary carriage is in its lowermost position, said reflector being movably mounted so as to assume a position to direct heat from said heater toward and away from said thermally responsive element and means effective upon moving said secondary carriage to its lowermost position for moving said reflector to a position to direct heat from said heater to said thermally responsive element, said reflector moving means being variable so as to direct more or less heat from said heater to said thermally responsive element.

8. A toaster comprising, a base, bread carriers movable from a bread receiving to a toasting position and spring-biased to bread receiving position, means for moving said carriers to toasting position, a thermal element mounted on said base operative to control the duration of the toasting intervals, a heater for said thermally responsive element carried by said carriers in a position to heat said thermally responsive element when said carriers are in toasting position, a reflector carried by said carriers above said heater for directing more or less heat from said heater to said thermally responsive element, said reflector being mounted for movement relative to said carriers to and from a position to effect radiation of heat from said heater to said thermally responsive element, means for moving said carriers to toasting position, means operative to latch said carriers in toasting position and means coacting with said reflector and operative upon movement of said carriers to toasting position for moving said reflector into a position to direct heat from said heater to said thermally responsive element.

9. A toaster comprising, a base, bread carriers movable from a bread receiving to a toasting position and being spring-biased to bread receiving position, means for moving said carriers to toasting position, a thermal element mounted on said base for controlling the duration of the toasting intervals, a heater for said thermally responsive element carried by said carriers in a position to heat said thermally responsive element when said carriers are in toasting position, a reflector carried by said carriers above said heater for directing more or less heat from said heater to said thermally responsive element, said reflector being mounted for movement to and from a position to effect radiation of heat from said heater to said thermally responsive element, means for moving said carriers to toasting position, means for latching said carriers in toasting position and means effective upon movement of said carriers to toasting position for moving said reflector to a position to reflect heat from said heater to said thermally responsive element, said last mentioned means including a movable stop mounted on said base in a position to engage said reflector and move it to its effective position.

10. A toaster comprising, a base, bread carriers movable from a bread receiving to a toasting position and spring-biased to bread receiving position, a thermal element mounted on said base for controlling the duration of the toasting intervals, a heater for said thermally responsive element carried by said carriers in a position to heat said thermally responsive element when said carriers are in toasting position, a reflector carried by said carriers above said heater for directing more or less heat from said heater to said thermally responsive element, said reflector being mounted for movement to and from a position to effect radiation of heat from said heater to said thermally responsive element, means for moving said carriers to toasting position, means for latching said carriers in toasting position and means effective upon movement of said carriers to toasting position for moving said reflector to a position to reflect heat from said heater to said thermally responsive element, said last mentioned means including a movable stop mounted on said base in a position to engage said reflector and move it to its effective position and means responsive to ambient toaster temperature for moving said stop for varying the quantity of heat reflected to said thermally responsive element.

11. A toaster comprising, a base, bread carriers movable from a bread receiving to a toasting position and spring-biased to bread receiving position, a thermal element mounted on said base for controlling the duration of the toasting intervals, a heater for said thermally responsive element carried by said carriers in a position to heat said thermally responsive element when said carriers are in toasting position, a reflector carried by said carriers above said heater for directing more or less heat from said heaters to said thermally responsive element, said reflector being mounted for movement to and from a position to effect radiation of heat from said heater to said thermally responsive element, means for moving said carriers to toasting position, means for latching said carriers in toasting position, means effective upon movement of said carriers to toasting position for moving said reflector to a position to reflect heat from said heater to said thermally responsive element, said last mentioned means including a movable stop mounted on said base in a position to engage said reflector and move it to its effective position and means responsive to ambient toaster temperature for moving said stop for varying the quantity of heat reflected to said thermally responsive element, said stop also being manually adjustable to vary the duration of said toasting interval.

12. A toaster comprising, a base, bread carriers movable from a bread receiving position to a toasting position and spring-biased to bread receiving position, a secondary carriage carried by said carriers, said secondary carriage being movable vertically relative to said carriers and spring-biased to its lowermost position, a signal light, main heaters for performing the toasting function, a thermal element mounted on said base for controlling the duration of the toasting interval, an auxiliary heater mounted on said secondary carriage in a position to heat said thermally responsive element when said secondary carriage is in its lowermost position, a switch mounted on said base for energizing said signal light, means for moving said carriers to toasting position, means carried by said carriers for closing said switch, spaced contacts mounted on said base, a bridging contact carried by said secondary carriage, said contacts being so connected to said main and auxiliary heaters that said heaters will be energized when said bridging contact comes into contact with said spaced contacts, said thermally responsive element having a hot position and a cold position, means for latching said carriers in toasting position whether said thermally responsive element is in its hot or cold position, a stop for preventing movement of said secondary carriage to its lowermost position when said thermally responsive element is in its hot position and means responsive to movement of said thermally responsive element from its hot position to its cold position for releasing said stop to permit said secondary carriage to move to its lowermost position and bring said bridging contact into contact with said spaced contacts.

13. A toaster comprising, bread carriers movable from a bread receiving to a toasting position and spring-biased to bread receiving position, heating means, latch means cooperating with said carriers and operative to latch them in toasting position, a thermal timer coacting with said latch means and operative to release it at the end of each toasting interval, said thermal timer having a cold position and a hot position, said latch means including a latch release lever, an actuating lever, a stop lever and a locking latch, said actuating lever being movable with said thermal timer in its movements to and from its cold and hot positions, said latch release lever being spring biased to latching position and being positioned to be engaged by said actuating lever upon movement of said thermal timer to its hot position, said stop lever being movable from a position to prevent movement of said actuating lever to its latch releasing position to a position permitting such movement and said locking latch being movable by movement of said timer into a position to engage said stop lever and hold it in a position to prevent movement of said actuating lever to its releasing position so long as said timer is in its hot position the arrangement being such that movement of said thermally responsive element from its cold position to its hot position will actuate said actuating lever to operate said latch release lever and movement of said carriers to bread receiving position will engage said locking latch and stop lever with each other and prevent movement of said actuating lever in a releasing direction until said thermally responsive element has returned to its cold position.

14. A toaster comprising; a base for supporting the toaster; a bread carrier movable from an upper bread receiving position to a toasting position; main heating means; a latch constructed to latch said carrier in toasting position; and a thermal timer of the heat-up type operable to release said latch upon being heated to end each toasting interval; said timer including a thermally responsive element, an auxiliary heater therefor and a reflector positioned to direct heat from said heater to said thermally responsive element; said auxiliary heater and reflector being mounted on said carrier in a position to move away from said thermally responsive element when said latch is released and toward said thermally responsive element when said carrier is moved to toasting position; said thermally responsive element being mounted on said base in a compartment separated from said main heating means and said base being constructed to provide for the circulation of cooling air over said thermally responsive element.

15. A toaster comprising; a base; main heaters carried by said base; a bread carrier movable relative to said base from a bread receiving position to a toasting position adjacent said heaters; means for moving said carrier to toasting position; a latch positioned to latch said carrier in toasting position and a thermal timer of the heat-up type operable to release said latch when heated to end each toasting interval; said timer including a thermally responsive element, a heater therefor and a reflector positioned to direct heat from said heater to said thermally responsive element; said thermally responsive element being mounted in fixed relation to said base in a chamber separated from said main heaters and said heater and reflector being mounted for movement with said carrier; the arrangement being such that said heater and reflector is in a position adjacent to said thermally responsive element when said carrier is in toasting position and in a position remote from said thermally responsive element when said carrier is in bread receiving position; said base being constructed for the circulation of cooling air over said thermally responsive element.

16. A toaster comprising; a base; a bread carrier movable from an upper bread receiving position to a lower toasting position, a secondary carriage movable with said carrier, said secondary carriage being mounted for movement relative to said carrier, means positioned to latch said carrier in toasting position, a thermal timer operable to release said carriers at the end of each toasting interval, said timer including a thermally responsive element mounted on said base and a heater mounted on said secondary carriage so that said heater is adjacent said thermally responsive element when said carrier is in toasting position and remote therefrom when said carrier is in bread receiving position, means for arresting movement of said secondary carriage when said thermally responsive element is hot, and switch means for energizing said heater, said switch means being so related to said carrier and to said secondary carriage and to said base as to be operable to energize said heater when said bread carrier and said secondary carriage are in their lowermost position and inoperative to energize said heater when either said carrier or said secondary carriage is above its lowermost position.

17. In a timing device for an electric circuit, a movable support, a manually operable handle for moving said support to initiate a timing period, a switch member mounted on said support and movable with said support between circuit opening and circuit closing positions, a releasable element for holding said switch member in circuit closing position upon initiation of a timing period, a heater connected in the circuit, a thermo-bar closely associated with said heater and heated thereby when said switch member is in circuit closing position, a tension spring across the ends of said thermo-bar flexing said thermo-bar in one direction when the bar is cold, said thermo-bar when heated to a predetermined temperature being arranged to flex in the opposite direction against the tension of said spring and suddenly release said element, thereby releasing the switch for movement to open position to terminate the timing period, stop means, said stop means being movable to a position to arrest movement of said support and prevent movement of said switch member to circuit closing position and being movable from its support arresting position to permit said switch member to move to circuit closing position, and means associated with said thermo-bar and operatively associated with said stop means to move the latter to its support arresting position when said thermo-bar is heated and to release said stop means for movement from its support arresting position when said thermo-bar cools.

18. In a timing device for an electric circuit, a movable support, manually operable means for moving said support to initiate a timing period, a switch member mounted on said support and movable therewith between circuit opening and closing positions, a releasable element for holding said switch member in circuit closing position upon the initiation of a timing period, a heater connected in the circuit, a thermo-bar associated with said heater and heated thereby when said switch member is in circuit closing position, spring means biasing the ends of said thermo-bar toward each other to flex said thermo-bar in one direction when the bar is cold, said thermo-bar when heated to a predetermined temperature being arranged to flex in the opposite direction against the bias of said spring means and suddenly release said element, thereby releasing the switch for movement to open position to terminate the timing period, stop means, said stop means being movable to a position to arrest movement of said support and prevent movement of said switch member to circuit closing position and being movable from its support arresting position to permit said switch member to move to circuit closing position, and means associated with said thermo-bar and operatively associated with said stop means to lock the latter in its support arresting position when said thermo-bar is heated and to release said stop means for movement from its support arresting position when said thermo-bar cools.

19. In a timing device for an electric circuit, a movable support, manually operable means for moving said support to initiate a timing period, a switch member mounted on said support and movable therewith between circuit opening and circuit closing positions, a releasable element for holding said switch member in circuit closing position upon the initiation of a timing period, a heater connected in the circuit, a thermal timer associated with said heater and heated thereby when said switch member is in circuit closing position, said thermal timer being constructed to flex in one direction when cold, said thermal timer when heated to a predetermined temperature being arranged to flex in the opposite direction and suddenly release said element, thereby releasing the switch for movement to open position to terminate the timing period, stop means, said stop means being movable to a position to arrest movement of said support and prevent movement of said switch member to circuit closing position and being movable from its support arresting position to permit said switch member to move to circuit closing position, and means associated with said thermal timer and operatively associated with said stop means so as to lock said stop means in its support arresting position when said thermal timer is heated and to release said stop means for movement from its support arresting position when said thermal timer cools.

20. A toaster comprising, a base, main heaters for performing a toasting function, a thermal timer mounted on said base, bread carriers movable from bread receiving to toasting position adjacent said main heaters and being spring-biased to receiving position, an auxiliary carriage slidably mounted on said bread carriers for vertical reciprocation and being spring-biased to downward position, a heater mounted on said auxiliary carriage in a position to be located above said timer when said carriers are moved to toasting position, means for moving said carriers to toasting position, means for arresting movement of said auxiliary carriage as said carriers are moved to toasting position to position said heater above said timer, control means actuatable to control said heaters to initiate a toasting interval and means actuated by said timer for terminating a toasting interval after its initiation.

ANTHONY G. HORVATH.

REFERENCES CITED

The following references are of record in the file of this patent:

UNITED STATES PATENTS

| Number | Name | Date |
|---|---|---|
| 1,862,733 | Wright | June 14, 1932 |
| 2,167,121 | McCreary et al. | July 25, 1939 |
| 2,196,394 | Ireland | Apr. 9, 1940 |
| 2,268,655 | Gomersall | Jan. 6, 1942 |
| 2,271,485 | Koci | Jan. 27, 1942 |
| 2,347,385 | Wright et al. | Apr. 25, 1944 |
| 2,426,620 | Koci | Sept. 2, 1947 |
| 2,429,475 | McNairy et al. | Oct. 21, 1947 |
| 2,436,735 | Walder et al. | Feb. 24, 1948 |
| 2,459,170 | Koci | Jan. 18, 1949 |
| 2,508,464 | McCullough | May 23, 1950 |